United States Patent
Vandamme

(10) Patent No.: US 9,750,194 B2
(45) Date of Patent: Sep. 5, 2017

(54) REVERSING MECHANISM AND CONVEYING MEANS AND AGRICULTURAL BALER PROVIDED THEREWITH

(71) Applicant: CNH Industrial America LLC, New Holland, PA (US)

(72) Inventor: Dirk A. R. Vandamme, Uitkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/352,539

(22) PCT Filed: Oct. 16, 2012

(86) PCT No.: PCT/EP2012/070509
§ 371 (c)(1),
(2) Date: Apr. 17, 2014

(87) PCT Pub. No.: WO2013/057114
PCT Pub. Date: Apr. 25, 2013

(65) Prior Publication Data
US 2014/0237982 A1 Aug. 28, 2014

(30) Foreign Application Priority Data
Oct. 17, 2011 (BE) .................................. 2011/0606

(51) Int. Cl.
*A01F 15/10* (2006.01)
*A01F 15/08* (2006.01)

(52) U.S. Cl.
CPC .......... *A01F 15/10* (2013.01); *A01F 15/0841* (2013.01)

(58) Field of Classification Search
CPC .......... A01F 15/10; A01D 78/02; A01D 78/14
See application file for complete search history.

(56) References Cited

U.S. PATENT DOCUMENTS

| 2,627,761 | A | * | 2/1953 | Recker | ...................... B60P 1/00 414/527 |
| 3,608,557 | A | * | 9/1971 | Evans | ...................... A01F 12/28 460/103 |
| 4,296,596 | A | * | 10/1981 | Waldrop | ............. A01F 15/0883 56/341 |
| 4,424,662 | A | * | 1/1984 | Eggers | .................. A01F 15/085 100/88 |

(Continued)

FOREIGN PATENT DOCUMENTS

EP 0139264 A1 5/1985

*Primary Examiner* — Alicia Torres
*Assistant Examiner* — Adam Behrens
(74) *Attorney, Agent, or Firm* — Peter K. Zacharias; Peter M. Sheldrake

(57) ABSTRACT

Reversing mechanism for an agricultural baler wherein the reversing mechanism includes a driving pulley mounted for rotation together with the conveying elements provided to be connected to the axis such that the axis and the conveying elements can be rotated along the working direction by a driving belt engaging the driving pulley. A tensioning pulley is provided for controlling the tension of the driving belt such that by engaging the driving belt, the driving belt engages the driving pulley such that the axis is rotationally driven by the driving belt, and by sufficiently releasing the driving belt, the driving belt no longer engages the driving pulley and the axis is no longer rotationally driven by the driving belt.

14 Claims, 2 Drawing Sheets

(56) References Cited

U.S. PATENT DOCUMENTS

| | | | | |
|---|---|---|---|---|
| 4,430,847 A * | 2/1984 | Tourdot | A01D 41/1274 | |
| | | | 474/1 | |
| 4,467,590 A * | 8/1984 | Musser | A01D 69/00 | |
| | | | 56/11.2 | |
| 4,512,139 A * | 4/1985 | Musser | A01D 41/142 | |
| | | | 56/11.2 | |
| 4,663,919 A * | 5/1987 | Stroh | A01D 69/00 | |
| | | | 56/11.2 | |
| RE32,599 E * | 2/1988 | Musser | A01D 69/00 | |
| | | | 56/10.8 | |
| 4,838,016 A * | 6/1989 | Frogbrook | A01F 15/07 | |
| | | | 100/5 | |
| 4,879,868 A * | 11/1989 | Love | A01D 69/00 | |
| | | | 56/11.2 | |
| 5,996,324 A * | 12/1999 | Oligmueller | A01D 69/00 | |
| | | | 56/11.2 | |
| 6,474,228 B1 * | 11/2002 | Leupe | A01F 15/04 | |
| | | | 100/100 | |
| 6,644,006 B1 * | 11/2003 | Merritt | A01D 69/00 | |
| | | | 56/11.2 | |
| 6,651,412 B1 | 11/2003 | Sierk et al. | | |
| 6,679,042 B1 * | 1/2004 | Schrag | A01F 15/10 | |
| | | | 56/341 | |
| 6,681,552 B2 * | 1/2004 | Nelson | A01F 15/085 | |
| | | | 56/11.2 | |
| 6,722,112 B2 * | 4/2004 | Pierce | A01D 41/142 | |
| | | | 460/16 | |
| 6,925,788 B2 * | 8/2005 | Nelson | A01F 15/085 | |
| | | | 56/11.2 | |
| 7,052,423 B2 * | 5/2006 | Jonckheere | A01D 69/00 | |
| | | | 474/148 | |
| 7,520,113 B2 * | 4/2009 | Johnson | A01D 41/142 | |
| | | | 460/20 | |
| 7,654,069 B1 * | 2/2010 | Dunham | A01D 89/008 | |
| | | | 56/190 | |
| 7,669,400 B2 * | 3/2010 | Naaktgeboren | A01D 69/00 | |
| | | | 254/213 | |
| 7,942,599 B2 * | 5/2011 | Naaktgeboren | A01D 90/14 | |
| | | | 403/2 | |
| 2004/0166975 A1 * | 8/2004 | Gibson | F16D 41/20 | |
| | | | 474/112 | |
| 2007/0240398 A1 * | 10/2007 | Naaktgeboren | A01D 69/00 | |
| | | | 56/341 | |
| 2008/0015033 A1 * | 1/2008 | Naaktgeboren | A01D 90/14 | |
| | | | 464/32 | |
| 2010/0242747 A1 * | 9/2010 | Kraus | A01F 15/101 | |
| | | | 100/35 | |

* cited by examiner

REVERSING MECHANISM AND CONVEYING MEANS AND AGRICULTURAL BALER PROVIDED THEREWITH

This application is the US National Stage filing of International Application Serial No. PCT/EP2012/070509 filed on Oct. 16, 2012 which claims priority to Belgian Application BE2011/0606 filed Oct. 17, 2011, each of which is incorporated herein by reference in its entirety.

The current invention relates to a reversing mechanism according to the preamble of the first claim.

The present invention also relates to conveying means and an agricultural baler provided therewith.

Such reversing mechanisms are already known to the person skilled in the art. EP 1 847 170 A1 for example describes a reversing mechanism for conveying means of an agricultural baler. The conveying means are provided for moving cut crop material from the ground to a bale forming chamber of the agricultural baler along a pick-up direction of the agricultural baler. The conveying means thereto comprises a feeder duct provided to receive cut crop material from a field before it is discharged to the bale forming chamber. A stuffer discharges cut crop material from the feeder duct to the bale forming chamber. Propelling means in the form of a rotor are provided for conveying cut crop material in the feeder duct by conveying elements of the rotor mounted around an axis of the rotor such that the conveying elements rotate along a working direction. A ratchet of the reversing mechanism is mounted to the axis such that the ratchet rotates together with the rotor. The reversing mechanism is provided to the rotor such that the pawl carried by the reverser of the reversing mechanism, is provided to engage the ratchet when the reciprocating means reciprocate the reverser such that the rotor rotates in a direction opposing the working direction. Further a gear is provided to the axis of the rotor such that the gear rotates together with the axis, a drive chain engaging the gear such that rotation of the axis can be driven by the chain.

EP 1 847 170 A1 further describes that when, during use, a blockage of the rotor occurs, an overload safety device activates in the drive line such that the drive is interrupted and the operator has to switch off the drive to the baler. The operator subsequently rotates the rotor in the reverse sense to release the blockage. EP 1 847 170 A1 further describes that an additional problem arises when the operator accidentally re-engages the drive to the baler before the reverser has again reached its original position after having reversed the rotor, the park position, in which the pawl no longer engages the ratchet as in such a situation the drive of the axis is being opposed by engagement of the pawl and the ratchet which is extremely detrimental for, for example, the pawl, the reverser, the drive, the baler, etc.

To overcome the additional problem, EP 1 847 170 A1 describes an adapted reverser with a spring such that the reverser returns to its original position, even when the drive to the baler is preliminarily re-engaged by the operator.

However, such a solution makes the reverser and the reversing mechanism more complicated which is often not desired.

Therefore, it is an object of the current invention to provide a reversing mechanism in which the reverser is less complicated but which nevertheless avoids the detrimental effects of preliminary re-engagement of the drive to the baler.

This is achieved according to the reversing mechanism according to the characterizing part of the first claim.

Thereto, the reversing mechanism comprises a driving pulley mounted for rotation together with the conveying elements provided to be connected to the axis such that the axis and the conveying elements can be rotated along the working direction by a driving belt engaging the driving pulley.

Such a driving pulley in combination with a belt driving the driving pulley acts as a clutch drastically decreasing the engagement between the driving pulley and the belt, for example in case the driving belt starts driving the axis when the reverser is rotating the conveying elements in the direction opposing the working direction, such that the drive of the axis is interrupted when resistance to driving the axis becomes too large and damage to the ratchet, the pawl, the axis, etc. is prevented. The reversing mechanism according to the current invention can be obtained by simply replacing the gear on existing reversing mechanisms by a driving pulley and without having to make the reverser more complicated.

Moreover, the reversing mechanism comprises a tensioning pulley provided for controlling the tension of the driving belt such that by sufficiently engaging the driving belt, the driving belt engages the driving pulley such that the axis is rotationally driven by the driving belt, and by sufficiently releasing the driving belt, the driving belt no longer engages the driving pulley and the axis is no longer rotationally driven by the driving belt. Preferably, the reversing mechanism comprises controlling means for controlling the tension of the driving belt with the tensioning pulley. More preferably, the controlling means are, preferably electrically or mechanically, controllable by the operator, for example from its driving seat. Such a tensioning pulley avoids the need to have the drive to the baler completely interrupted such as to allow the reverser to rotate the conveyer elements in a direction opposing the working direction and instead allows interrupting the driving of the axis by the belt using the tensioning pulley.

Moreover, as the different components of the rotating means, such as for example an auxiliary rotor for directing the cut crop material coming from the pick-up assembly towards the propelling means and below the axis of the propelling means, a cut rotor, a pick-up assembly for lifting cut crop material off the field and propelling means for propelling the cut crop material lifted by the pick-up assembly to the feeder duct, the axes of the pick-up assembly and the propelling means being substantially parallel with respect to each other, etc., are often all driven by a single source, such as for example a single drive of the baler, for example driven by the tractor pulling the baler, and are thereto interconnected to each other, it is not always desired that by rotating the conveying elements in a direction opposing the working direction all different components of the rotating means are rotated in a direction opposing the working direction. The combination of the drive belt, driving pulley and tensioning pulley however allows that the conveying elements rotated by the reverser in a direction opposing the working direction can be rotated by the reverser in a direction opposing the working direction without necessarily, although possibly if desired, all the other components of the rotating means are rotated in a direction opposing the working direction, allowing the reverser to be operated with a more limited amount of power. Such an assembly for example makes it possible to provide at least two, or even all, of the components of the rotating means with a respective reverser, each respective reverser operating independently from the other.

Although a drive belt in combination with a driving pulley for driving an axis and a tensioning pulley for an agricultural device are for example already described in U.S. Pat. No. 6,651,412 B1, it does not describe to use the driving pulley in a reversing mechanism.

According to more preferred embodiments of the current invention, the tensioning pulley and the reverser are provided such that upon reciprocating the reverser, the driving pulley releases the driving belt sufficiently such that the driving belt no longer rotationally drives the axis and such that when the reverser returns to its original position, the driving belt sufficiently engages the driving pulley such that the axis is rotationally driven by the driving belt. The tensioning pulley and the reverser thereto are for example mechanically linked with respect to each other. Such a configuration allows that the driving of the axis is interrupted together with the reciprocating motion of the reverser and is restored thereafter, preventing, for example, that the reverser and the tensioning pulley have to be individually controller by, for example, the operator.

The invention also relates to conveying means for an agricultural baler comprising the reversing mechanism according to the invention. The conveying means are provided for moving cut crop material from the ground to a bale forming chamber along a pick-up direction of the agricultural baler and thereto comprises a feeder duct provided to receive cut crop material from a field prior to the cut crop material being discharged to the bale forming chamber, a stuffer for discharging cut crop material from the feeder duct to the bale forming chamber and rotating means provided for conveying cut crop material in the feeder duct by conveying elements of the rotating means mounted around an axis of the rotating means such that the conveying elements can rotate along a working direction, the ratchet of the reversing mechanism being mounted to the axis such that the ratchet rotates together with the conveying elements and the reversing mechanism being provided to the conveying means such that the pawl carried by the reverser of the reversing mechanism, is provided to engage the ratchet when the reciprocating means reciprocate the reverser such that the conveying elements rotate in a direction opposing the working direction, the driving pulley being mounted to the axis for rotation together with the conveying elements such that the axis and the conveying elements can be rotated along the working direction by a driving belt engaging the driving pulley.

According to preferred embodiments of the current invention, the rotating means comprise a pick-up assembly for lifting cut crop material off the field and propelling means for propelling the cut crop material lifted by the pick-up assembly to the feeder duct, the axes of the pick-up assembly and the propelling means being substantially parallel with respect to each other.

According to further preferred embodiments of the current invention, the propelling means comprise a cut rotor.

According to preferred embodiments of the current invention, the rotating means comprise at least one auger for directing the cut crop material lifted from the field along a direction cross to the pick-up direction, the axis of the auger being substantially parallel to the axes of the pick-up assembly and the propelling means.

According to preferred embodiments of the current invention the rotating means comprise an auxiliary rotor for directing the cut crop material coming from the pick-up assembly towards the propelling means and below the axis of the propelling means.

According to further preferred embodiments of the current invention, the ratchet and the driving pulley are mounted to the auxiliary rotor axis of the rotating means. As in such configuration of the conveying means, the different axes of the different parts of the rotating means are closely spaced with respect to each other, there is little space for manipulating the cut crop material in between the different parts of the rotating means while the risk for the cut crop material to clog in between the different parts of the rotating means is increased. Therefore, especially in such conveying means there is a substantial need for a reversing mechanism, especially a reversing mechanism according to the current invention. An example of an agricultural baler having such a closed spaced configuration is for example shown in WO2004/043682A2.

The invention also relates to an agricultural baler comprising the conveying means according to the invention, wherein the conveying means are provided for moving cut crop material from the ground to a bale forming chamber of the agricultural baler.

The invention will be further elucidated by means of the following description and the appended figures.

Figure 1:
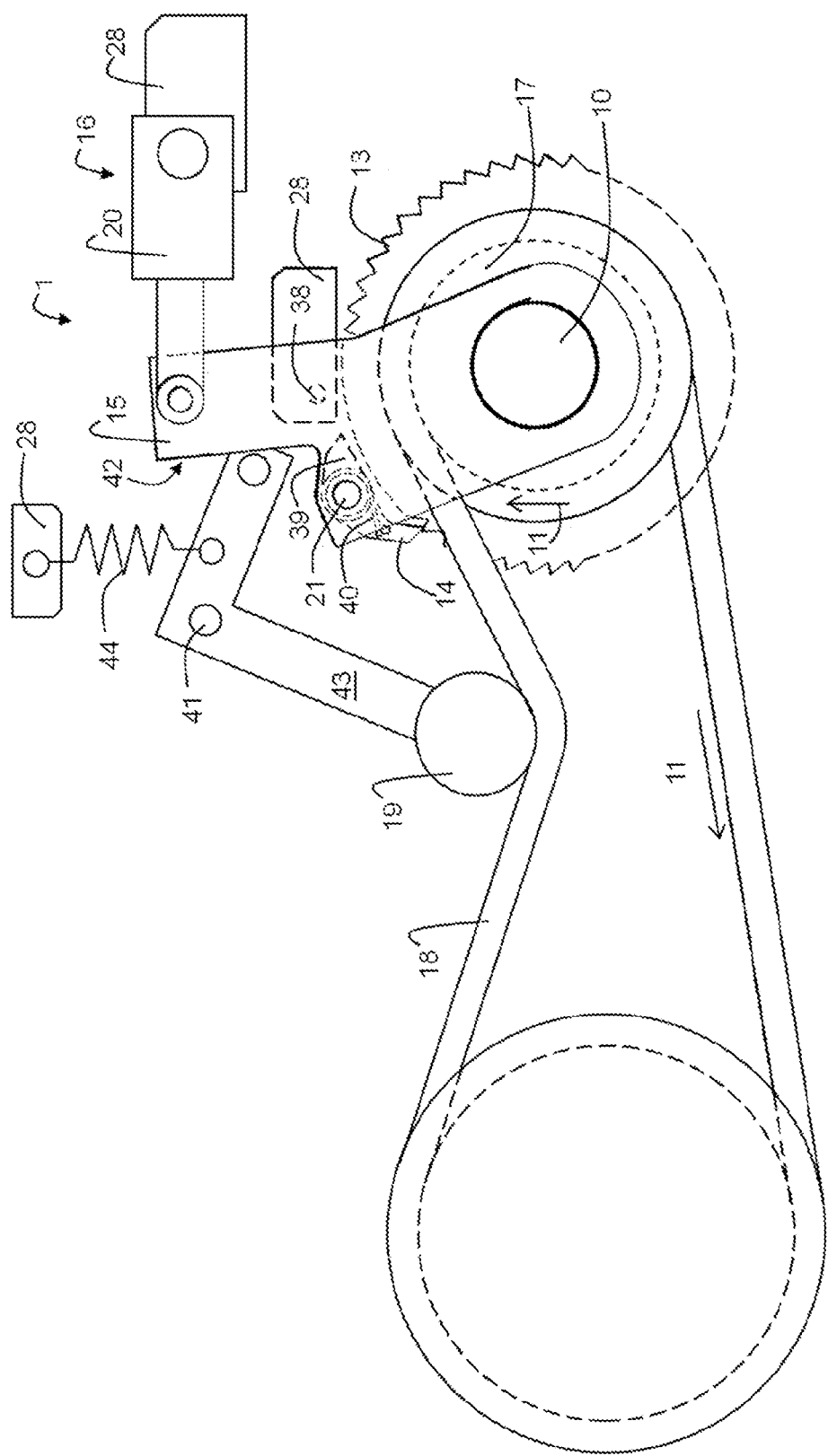
FIG. 1 shows a schematic side view of the reversing mechanism according to the invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter;

it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Figure 2:
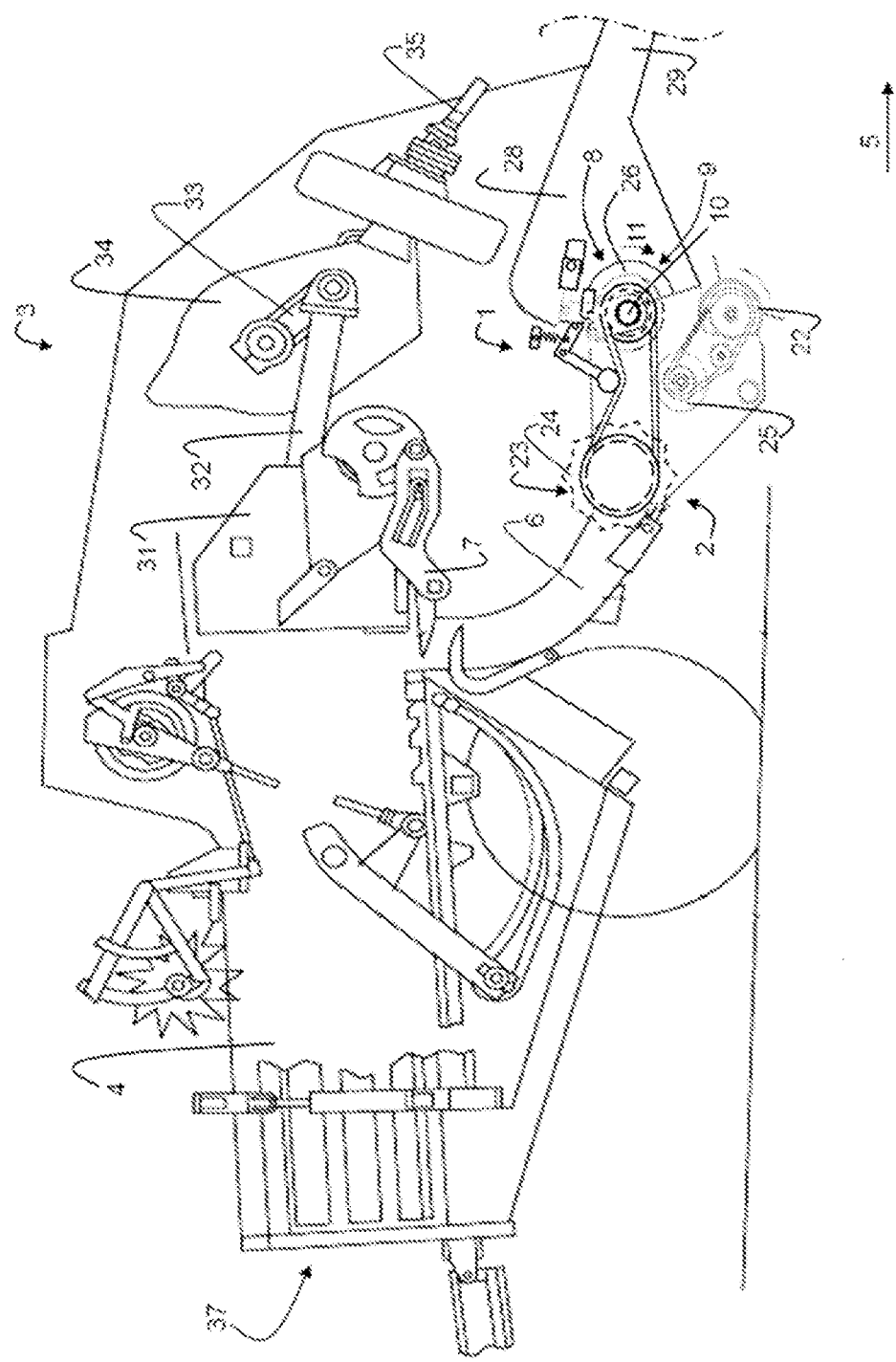
FIG. 2 shows a schematic overview of a baler according to the invention.

FIG. 2 shows a schematic overview of an agricultural baler according to the invention, more specifically, but not critical for the invention, an agricultural square baler.

The baler 3 comprises conveying means 2 according to the invention. The conveying means are provided for moving cut crop material from the ground to a bale forming chamber 4 of the baler 3 along a pick-up direction 5 of the baler 3.

The conveying means 2 thereto comprises a feeder duct 6 provided to receive cut crop material from a field prior to the cut crop material being discharged to the bale forming chamber 4, a stuffer 7 for discharging cut crop material from the feeder duct 6 to the bale forming chamber 4 and rotating means 8 provided for conveying cut crop material in the feeder duct 6 by conveying elements 9 of the rotating means 8. The conveying elements are mounted around an axis 10 of the rotating means 8 such that the conveying elements 9 can rotate along a working direction 11.

The agricultural baler 3 further preferably comprises a frame 28 which is equipped with a forwardly extending tongue 29 provided with hitch means (not shown) at its front end for coupling the baler 3 to for example a towing tractor. A conventional pick-up assembly 22 of the rotating means 8 lifts windrowed crop material off the field as the baler 3 is travelled thereover and delivers such material into the front end of the preferably rearwardly and upwardly curved, charge-forming feeder duct 6. The duct 6 communicates at preferably its upper end with the preferably overhead, fore-and-aft extending baling chamber, or bale forming chamber, 4 into which crop charges are loaded by the preferably cyclically operating stuffer mechanism or stuffer 7. Preferably, propelling means 23, for example comprising a continuously operating packer mechanism at the lower front end of the feeder duct 6 and/or a cut rotor 24, preferably a continuously operating packer mechanism at the lower front end of the feeder duct 6 or a cut rotor 24, continuously feeds and packs material into the duct 6 as to cause charges of the crop material to take on and assume the internal configuration of the duct 6 prior to periodic engagement by the stuffer 7 and insertion up into the baling chamber 4. The feeder duct 6 may be equipped with means for establishing whether a complete charge has been formed therein and operating the stuffer 7 in response thereto. Each action of the stuffer 7 introduces a "charge" or "flake" of crop material from the duct 6 into the chamber 4.

The direction of travel or pick-up direction 5 is indicated with an arrow pointing along the direction of travel during operation of the agricultural square baler 3.

Preferably, a plunger 31 reciprocates in a fore-and-aft direction within the baling chamber 4 under action of a pair of pitman rods 32 which are linked to the crank arms 33 of a gearbox 34 rotated by a shaft 35 which is connected to the PTO shaft of the tractor. The reciprocating plunger 31 pushes each new charge introduced into the baling chamber 4 rearwardly and forms the subsequent charges into a bale of crop material, which is pushed by the plunger 31 toward a rearmost discharge aperture 37 of the chamber 4.

FIG. 2 further shows that the rotating means 8 comprise propelling means 23 for propelling the cut crop material lifted by the pick-up assembly 22 to the feeder duct 6. The axes of the pick-up assembly 22 and the propelling means 23 are substantially parallel with respect to each other.

Preferably, the propelling means 23 comprise a cut rotor 24.

FIG. 2 shows that the rotating means 8 comprise at least one auger 25 for directing the cut crop material lifted from one auger 25 for directing the cut crop material lifted from the field along a direction cross to the pick-up direction 5. The axis of the auger 25 thereto is substantially parallel to the axes of the pick-up assembly 22 and the propelling means 23.

FIG. 2 further shows that the rotating means 8 comprise an auxiliary rotor 26 for directing the cut crop material coming from the pick-up assembly 22 towards the propelling means 23 and below the axis 10 of the propelling means 23.

Such pick-up assembly 22, propelling means 23, such as for example a cut rotor 24, auger 25 and auxiliary rotor 26 are for example also described in WO2004/043682A2.

The conveying means 2 according to the invention comprise a reversing mechanism 1 according to the invention. Such a reversing mechanism 1 is for example shown in FIG. 1 while FIG. 2 shows a preferred mounting of the reversing mechanism 1 in the conveying means 2.

The reversing mechanism 1 according to the invention comprises a ratchet 13 and a pawl 14 carried by a reverser 15 of the reversing mechanism 1. The pawl 14 is provided to engage the ratchet 13 when reciprocating means 16 of the reversing means reciprocate the reverser 15. Preferably, the pawl 14 is provided such that upon return of the reverser 15 to its original position by the reciprocating means 16, the pawl 14 no longer engages the ratchet 13.

The reversing mechanism 1 according to the invention is provided to the conveying means 2 such that the ratchet 13 of the reversing mechanism 1 is mounted to the axis 10 such that the ratchet rotates together with the conveying elements 9 and such that the pawl 14 is provided to engage the ratchet 13 when the reciprocating means 16 reciprocate the reverser 15 such that the conveying elements 9 rotate in a direction opposing the working direction 11.

The reciprocating means 16 shown in FIG. 1 comprise an hydraulic cylinder 20 for reciprocating the reverser 15. This is however not critical for the invention and any type of reciprocating means 16 such as for example reciprocating means 16 mechanically linked to, for example, the baler drive are possible. The reciprocating means 16 could also be in the form of a mechanical link provided to be manually manipulated by, for example the operator when deemed necessary.

Ratchet 13 and pawl 14 connections are already known for the person skilled in the art, for example from EP 1 847 170 A1, and embodiments different from the embodiment shown in FIG. 1 are possible.

The reversing mechanism 1 comprises a driving pulley 17 mounted for rotation together with the conveying elements 9 and provided to be connected to the axis 10 such that the axis 10 and the conveying elements 9 can be rotated along the working direction 11 by a driving belt 18 engaging the driving pulley 17.

FIG. 2 shows the reversing mechanism 1 in the conveying means 2 with the driving pulley 17 mounted to the axis 10 for rotation together with the conveying elements 9 such that the axis 10 and the conveying elements 9 can be rotated along the working direction 11 by the driving belt 18 engaging the driving pulley 17.

The driving pulley 17 and the driving belt 18 can have any form and shape deemed appropriate by the person skilled in the art. The driving belt 18 preferably is in the form of a V belt, where the driving pulley 17 comprises grooves for receiving the driving belt 18. Such a belt and pulley are however not critical for the invention and the driving belt 18 can also be in the form of a flat belt with a corresponding flat driving pulley 17.

In FIG. 1, the ratchet 13 and the driving pulley 17 are mounted to a mutual axis of the reversing mechanism 1 such that the ratchet 13 and the driving pulley 17 rotate together with the axis 10, the axis 10 being provided to be provided with the conveying elements 9. In FIG. 1 it is shown that the mutual axis of the ratchet 13 and the driving pulley 17 is in the form of an extension of the axis 10. This is however not critical for the invention and the mutual axis of the ratchet 13 and the driving pulley 17 or the axes of the ratchet 13, the driving pulley 17 and the axis 10 can be mechanically connected to the axis 10, for example through a gear. However, by using a single axis for two or more of the axes of the ratchet 13, the driving pulley 17 and the axis 10 a more simple and/or reliable connection can be obtained.

Preferably, the reverser 15 is rotationally mounted with respect to the axis 10. Such an embodiment allows the reverser 15 to be moved around the axis 10. Although it has been found that such a connection allows a reliable and/or simple interconnection, other embodiments of the connection of the reverser 15 to the axis 10 are possible, such as for example a mechanical interconnection using different axes of rotation for the reverser 15 and the axis 10.

Preferably, the pawl 14 is mounted tiltably around a tilt axis 21 to the reverser 15, the pawl 14 being provided to tilt down to and engage the ratchet 13 upon reciprocating the reverser 15 and is provided to tilt up upon return of the reverser 15 to its original position. The pawl 14 thereto preferably is further connected springingly to the reverser 15, preferably by a spring 40 interconnecting the pawl 14 to the reverser 15 such that the pawl is springingly tilted down to the ratchet 13 by the spring when the reverser 15 is not in its original position but forced to be tilted away from the reverser 15 when the reverser 15 is in its original position. Thereto, preferably a protrusion 38 is provided which cooperates with the back part 39 of the pawl 14 not engaging the ratchet 13 such that upon return of the reverser 15 to its original position, the back part 39 contacts the protrusion 38 such that the pawl 14 is forced away from the ratchet 13. Such a pawl 14, ratchet 13, reverser 15 are for example shown in FIG. 1. Although such pawl 14, ratchet 13, reverser 15 provides for a simple and/or compact and/or reliable system, other embodiments are possible such as for example a mechanical and/or electronic system coordinating the movement of the pawl 14 with the reverser 15.

FIG. 1 shows that the tensioning pulley 19 and the reverser 15 are provided such that upon reciprocating the reverser 15, the driving pulley 17 releases the driving belt 18 sufficiently such that the driving belt 18 no longer rotationally drives the axis 10 and such that when the reverser 15 returns to its original position, the driving belt 18 sufficiently engages the driving pulley 17 such that the axis 10 is rotationally driven by the driving belt 18. Such a configuration allows reciprocating the reverser 15 without for example having to separately disengage the tensioning pulley 19 from the driving belt 18 such as to reduce resistance from the driving of the driving pulley 17 when rotating the conveying elements 9 in a direction opposing the working direction 11. However, it is not critical for the invention and alternatively additional means for disengaging the tensioning pulley 19 can be provided.

FIG. 1 shows that the tensioning pulley 19 tensions controls the tension of the driving belt 18 by a spring 44.

FIG. 1 shows that the reverser 15 is adapted for tilting the tensioning pulley 19 away from the driving belt 18 when reciprocating is reciprocated by pushing onto a lever 43 pivoting round a pivot 41. Thereto, the reverser 15 is provided with pushing means 42 pushing onto the lever 43 as described above when the reverser 15 is reciprocated. Preferably, the lever 43 and the reverser 15 are in the form of respectively a follower 43 and a cam 15, as shown in FIG. 1.

Preferably, and as shown in FIG. 2, the ratchet 13 and the driving pulley 17 are mounted to the auxiliary rotor 26 axis 10 of the rotating means 8, providing the auxiliary rotor 26 axis 27 with the reversing mechanism 1 according to the invention. Such a configuration is however not critical for the invention and the ratchet 13 and the driving pulley 17, the reversing mechanism 1, can also be mounted to one or more of the following components of the rotating means 8: pick-up assembly 22, propelling means 23, such as for example a cut rotor 24, auger 25 and auxiliary rotor 26. As the reversing mechanism 1 also comprises the driving pulley 17 and tensioning pulley 19, the components provided with the reversing mechanism 1 can be independently from the drive driving the baler, each other or further components connected to the drive driving the baler rotated in a direction opposing the working direction 11.

The invention claimed is:

1. Reversing mechanism for a crop conveying mechanism of an agricultural baler, the conveying mechanism comprising a feeder duct provided to receive cut crop material prior to a bale forming chamber by a stuffer of the conveying mechanism and a first feeding mechanism provided for conveying cut crop material in the feeder duct by conveying elements mounted around an axis of the of the first feeding mechanism such that the conveying elements can rotate in a working direction, the reversing mechanism comprising:

a ratchet configured for mounting to the axis such that the ratchet rotates together with the conveying elements and a pawl carried by a reverser of the reversing mechanism, the pawl being configured to engage the ratchet upon reciprocation of the reverser such that the conveying elements rotate in a direction opposing the working direction, a driving pulley mounted for rotation together with the conveying elements and configured for connection about the axis such that the axis and the conveying elements are configured for rotation in the working direction by a driving belt engaging the driving pulley, and a tensioning pulley provided for controlling the tension of the driving belt, such that by engaging the driving belt, the driving belt engages the driving pulley such that the axis is rotationally driven by the driving belt, and by releasing the driving belt by reciprocating the reverser the tensioning pulley is moved such that the driving belt no longer engages the driving pulley and the axis is no longer rotationally driven by the driving belt;

wherein the reverser is adapted for tilting the tensioning pulley away from the driving belt by pushing onto a lever connected to the tensioning pulley, the reverser having a surface along and over which a portion of the lever travels to thereby tilt the tensioning pulley; and wherein the ratchet and the driving pulley are mounted to the axis such that the ratchet and the driving pulley rotate together with the axis.

2. Reversing mechanism according to claim 1, wherein the tensioning pulley and the reverser are configured such that upon reciprocating the reverser, the tensioning pulley is moved such that the driving pulley releases the driving belt and the driving belt no longer rotationally drives the axis and such that when the reverser returns to its original position the tensioning pulley is again moved and the driving belt engages the driving pulley such that the axis is rotationally driven by the driving belt.

3. Reversing mechanism according to claim 1, wherein the reverser is rotationally mounted to the axis.

4. Reversing mechanism according to claim 3, wherein the ratchet is engaged upon reciprocation of a hydraulic cylinder for reciprocating the reverser.

5. Reversing mechanism according to claim 4, wherein the pawl is configured such that upon return of the reverser to its original position by the cylinder the pawl no longer engages the ratchet.

6. Reversing mechanism according to claim 5, wherein the pawl is mounted tiltably around a tilt axis to the reverser, the pawl configured to tilt down to and engage the ratchet upon reciprocating the reverser and is provided to tilt up upon return of the reverser to its original position.

7. Reversing mechanism according to claim 1, in combination with a crop conveying mechanism wherein the crop conveying mechanism comprises a feeder duct configured to receive cut crop material from a field prior to the cut crop material being discharged to a bale forming chamber, a stuffer for discharging cut crop material from the feeder duct to the bale forming chamber and a first feeding mechanism provided for conveying cut crop material in the feeder duct by conveying elements mounted around an axis of the first feeding mechanism such that the conveying elements can rotate in a working direction.

8. The combination as claimed in claim 7, further comprising a pick-up assembly for lifting cut crop material off the field and transferring it toward the crop conveying mechanism and a second feeding mechanism for propelling the cut crop material lifted by the pick-up assembly to the feeder duct, the axes of the pick-up assembly and the second feeding mechanism being parallel with respect to each other.

9. The combination as claimed in claim 8, wherein the second feeding mechanism comprises a cut rotor.

10. The combination as claimed in claim 8, wherein the first feeding mechanism comprise at least one auger for directing the cut crop material lifted from the field along a direction cross to the pick-up direction, the axis of the auger being parallel to the axes of the pick-up assembly and the second feeding mechanism.

11. The combination as claimed in claim 8, wherein the first feeding mechanism comprises an auxiliary rotor for directing the cut crop material coming from the pick-up assembly towards the second feeding mechanism and below the axis of the second feeding mechanism.

12. The combination as claimed in claim 11, wherein the ratchet and the driving pulley are mounted along the auxiliary rotor axis.

13. The combination of claim 7, further wherein a bale forming chamber is positioned and configured for receiving crop material from the conveying mechanism.

14. Reversing mechanism according to claim 1, wherein the surface of the reverser comprise a cam and a portion of the lever is a follower, such that movement between the follower and cam alter the engagement of the tensioning pulley with the driving belt.

* * * * *